Patented Oct. 10, 1933

1,930,051

UNITED STATES PATENT OFFICE 1,930,051

TREATMENT OF RUBBER

Louis H. Howland, Passaic, N. J., assignor to The Naugatuck Chemical Company, Naugatuck, Conn., a corporation of Connecticut No Drawing. Application March 31, 1930
Serial No. 440,630

4 Claims. (Cl. 18—50)

This invention relates to the treatment of rubber and similar vulcanizable materials, and particularly to retarding the deterioration of the same.

An object of this invention is to provide a class of chemicals which will retard the deterioration of rubber. A further object is to provide a process for improving the ageing of rubber.

Accordingly the invention comprises treating rubber with a material corresponding to the general formula

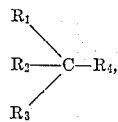

where $R_1$ and $R_2$ are amino substituted aryl radicals; $R_3$ is an aryl or substituted aryl radical, and $R_4$ is hydrogen or hydroxyl. Examples of such materials are tetra methyl diamino triphenyl methane, tetra methyl diamino triphenyl carbinol, diamino triphenyl methane, tetramino dimethyl triphenyl methane. The last mentioned material is represented by the formula, and the others correspond,

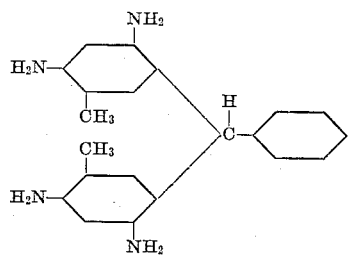

These chemicals may be added to rubber by any of the methods known to the art, for example, they may be added to the rubber mix on the mill or they may be applied to the rubber after vulcanization by dipping, painting, spraying, or in other ways. Or they may be mixed with rubber latex or dissolved in a suitable solvent and added to the latex in this way.

The compounds in which $R_4$ is hydrogen may be prepared by reacting an aromatic aldehyde or substituted aromatic aldehyde with an aromatic amine, illustrated generally by the equation

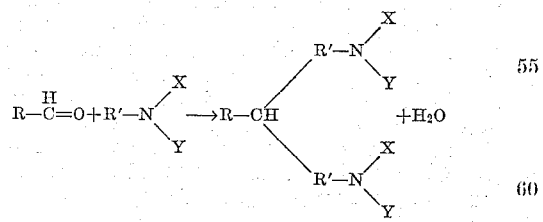

wherein R and R' are aromatic radicals and X and Y are hydrogen or alkyl groups,—and specifically by the following procedure:

One mole of benzaldehyde, two moles of aniline, and one mole of zinc chloride are made into a paste by adding dilute sulfuric acid while the mass is being ground. This paste is heated on the water bath for several hours. The reaction mixture is then dissolved in dilute sulfuric acid. The solution is then made strongly alkaline and filtered. The zinc remains in the filtrate. The solid product thus obtained is redissolved in acid and precipitated by making basic with ammonia. The precipitate is filtered, washed thoroughly, and dried. The product thus obtained may be crystallized from a solvent such as benzene.

The compounds in which $R_4$ is hydroxyl may be prepared by oxidizing the compounds in which $R_4$ is H, illustrated by tetramethyl diamino triphenyl carbinol in the following equation:

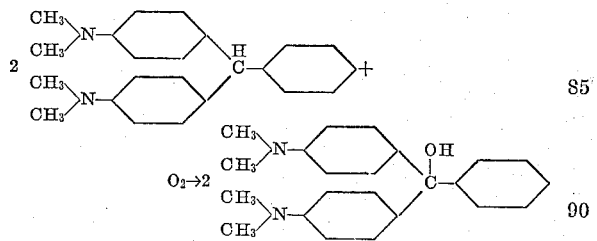

The following examples in which the parts are by weight are illustrative of the invention and are not to be construed as limiting thereof.

Example A 1.5 parts of diaminotriphenyl methane are incorporated in the usual manner by mixing on a rubber mill with a stock containing 100 parts pale crepe rubber, 10 parts of zinc oxide, 3 parts of sulfur, and .3 part of heptaldehyde-aniline condensation product diluted with spindle oil.

This mix, A, is vulcanized in a mold for 30 minutes and 60 minutes at a temperature corresponding to a steam pressure of 40 pounds per square inch. A similar mix, B, is made from which the antioxidant has been omitted. This mix is vulcanized under the same conditions. The resulting stocks are aged in the oxygen bomb for 216 hours at a pressure of 300 pounds per square inch and at a temperature of 60° C.

The tensile strength obtained before and after ageing are given below:

| Green tensiles | A | B |
|---|---|---|
| Cure 30′ @ 40# | 2615 | 2890. |
| Cure 60′ @ 40# | 3090 | 3070. |

| After aging 216 hrs. in oxygen | | |
|---|---|---|
| 30′@40# | 2235 | 1197. |
| 60′@40# | 2420 | Too poor to test. |

*Example B*

1.5 parts of tetramethyl diamino triphenyl carbinol are incorporated in the usual manner of mixing on a rubber mill in a stock similar to that described above. This mix, C, is vulcanized in the same manner as described above, together with a similar mix, D, from which the tetramethyl diamino triphenyl carbinol has been omitted. The resulting stocks are aged in the oxygen bomb as above for 216 hours. The tensiles obtained before and after ageing are given below:

| Green tensile | C | D |
|---|---|---|
| Cure 30′ @ 40# | 3615 | 2930. |
| Cure 60′ @ 40# | 3340 | 2655. |

| Aged 216 hrs. in oxygen | | |
|---|---|---|
| Cure 30′ @ 40# | 2815 | 930. |
| Cure 60′ @ 40# | 2245 | Too poor to test. |

The chemicals disclosed may be used to retard the deterioration of rubber in any form, for example, inner tubes, tires, thread, hose, dipped goods, mechanical goods, latex, or artificial dispersions of rubber or articles made from the same.

The term rubber in the claims is to be construed to cover rubber, balata, gutta percha and similar gums, whether they are compounded or exist as such.

It is obvious from the detailed disclosure above given that modifications will suggest themselves; for instance, any of the usual ingredients of a rubber mix may be varied at will and any other accelerators than those mentioned may be used,— and it is not desired to limit the invention otherwise than as set forth in the appended claims.

Having thus described my invention, what I claim and desire to protect by Letters Patents, is

1. A process of retarding the deterioration of rubber which comprises treating a rubber stock with a material comprising a compound having the formula

wherein $R_1$ and $R_2$ each represents a diamino substituted phenyl radical, $R_3$ represents a phenyl radical, and $R_4$ represents a substituent selected from the group consisting of hydrogen and hydroxyl.

2. A method of preserving rubber which comprises subjecting it to vulcanization in the presence of a material having the formula

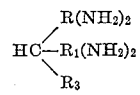

wherein R and $R_1$ are benzene groups each containing an alkyl substituent and $R_3$ is a benzene group.

3. A method of preserving rubber which comprises subjecting it to vulcanization in the presence of a material having the formula

wherein R and $R_1$ are phenyl groups each containing two amino substituents and $R_3$ is phenyl.

4. The method of preserving rubber which comprises subjecting it to vulcanization in the presence of tetramino dimethyl triphenyl methane.

LOUIS H. HOWLAND.